(12) United States Patent
Makino et al.

(10) Patent No.: US 10,456,829 B2
(45) Date of Patent: Oct. 29, 2019

(54) METHOD FOR MODIFYING REFRACTORY MOLDING PARTICLES AND REFRACTORY MOLDING PARTICLES OBTAINED THEREBY AND PROCESS FOR PRODUCING MOLD

(71) Applicant: Itochu Ceratech Corporation, Seto-Shi (JP)

(72) Inventors: Hiroshi Makino, Seto (JP); Masami Ono, Seto (JP)

(73) Assignee: Itochu Ceratech Corporation, Seto-Shi (JP)

(*) Notice: Subject to any disclaimer, the term of this patent is extended or adjusted under 35 U.S.C. 154(b) by 593 days.

(21) Appl. No.: 14/635,179

(22) Filed: Mar. 2, 2015

(65) Prior Publication Data

US 2015/0174645 A1 Jun. 25, 2015

Related U.S. Application Data

(63) Continuation of application No. PCT/JP2013/060627, filed on Apr. 8, 2013.

(30) Foreign Application Priority Data

Feb. 19, 2013 (JP) .................................. 2013-029632

(51) Int. Cl.
| | | |
|---|---|---|
| B22C 1/22 | (2006.01) | |
| B22C 9/02 | (2006.01) | |
| C04B 35/626 | (2006.01) | |
| C04B 35/185 | (2006.01) | |
| B22C 5/00 | (2006.01) | |
| C04B 35/107 | (2006.01) | |
| C04B 35/64 | (2006.01) | |
| C04B 35/101 | (2006.01) | |
| C04B 35/634 | (2006.01) | |
| C04B 35/657 | (2006.01) | |

(52) U.S. Cl.
CPC ............ *B22C 1/224* (2013.01); *B22C 5/00* (2013.01); *B22C 9/02* (2013.01); *C04B 35/101* (2013.01); *C04B 35/107* (2013.01); *C04B 35/185* (2013.01); *C04B 35/6265* (2013.01); *C04B 35/6268* (2013.01); *C04B 35/6269* (2013.01); *C04B 35/62695* (2013.01); *C04B 35/634* (2013.01); *C04B 35/64* (2013.01); *C04B 35/657* (2013.01); *C04B 2235/3217* (2013.01); *C04B 2235/3418* (2013.01); *C04B 2235/3463* (2013.01); *C04B 2235/5427* (2013.01); *C04B 2235/60* (2013.01); *C04B 2235/6027* (2013.01); *C04B 2235/96* (2013.01)

(58) Field of Classification Search
CPC . C04B 35/622; C04B 35/626; C04B 41/0072; C04B 41/87; B22C 1/224
See application file for complete search history.

(56) References Cited

U.S. PATENT DOCUMENTS

| | | | | |
|---|---|---|---|---|
| 4,383,957 | A * | 5/1983 | Yamakawa | ........... C04B 35/111 264/325 |
| 2004/0007345 | A1* | 1/2004 | Yasrebi | ................. C04B 35/111 164/516 |
| 2006/0005937 | A1 | 1/2006 | Sakaguchi et al. | |
| 2008/0274374 | A1* | 11/2008 | Ina | ........................... B22C 1/00 428/687 |
| 2009/0233081 | A1 | 9/2009 | Morikawa et al. | |
| 2010/0173767 | A1* | 7/2010 | Koch | ....................... B22C 5/06 501/128 |
| 2011/0073269 | A1 | 3/2011 | Frohn et al. | |
| 2011/0100578 | A1* | 5/2011 | Ina | ........................... B22C 1/22 164/4.1 |

FOREIGN PATENT DOCUMENTS

| | | | |
|---|---|---|---|
| CN | 101970375 A | 2/2011 | |
| CN | 102076440 A | 5/2011 | |
| EP | 2 272 603 A1 | 1/2011 | |
| JP | 03-133536 A * | 6/1991 | ............... B22C 1/00 164/5 |
| JP | 03-047943 B2 | 7/1991 | |
| JP | 04-040095 B2 | 7/1992 | |
| JP | 2003-251434 A | 9/2003 | |
| JP | 2004-202577 A1 | 7/2004 | |
| JP | 2004-237288 A1 | 8/2004 | |
| JP | 2011-025310 A1 | 2/2011 | |

OTHER PUBLICATIONS

Chinese Office Action (Application No. 201380073418.9) dated Jun. 13, 2016 (with English translation).
Extended European Search Report (Application No. 13875495.7) dated Jul. 13, 2016.
International Search Report (Application No. PCT/JP2013/060627) dated Jun. 11, 2013 (in English).

* cited by examiner

*Primary Examiner* — Kevin E Yoon
*Assistant Examiner* — Jacky Yuen
(74) *Attorney, Agent, or Firm* — Burr & Brown, PLLC

(57) ABSTRACT

Providing a method of modifying refractory particles used to produce a casting mold by using a furan resin as a binder, so as to effectively improve a strength of the casting mold and to reduce a required amount of the binder. An artificial aggregate which is artificially produced and which has an apparent porosity of not more than 5% is used as the refractory particles, and the artificial aggregate is subjected to a heat treatment at a temperature of 400-1500° C. for not shorter than one hour in a heating atmosphere having an oxygen concentration of not higher than 15%.

11 Claims, No Drawings

US 10,456,829 B2

METHOD FOR MODIFYING REFRACTORY MOLDING PARTICLES AND REFRACTORY MOLDING PARTICLES OBTAINED THEREBY AND PROCESS FOR PRODUCING MOLD

CROSS REFERENCE TO RELATED APPLICATION

This application is a continuation of the International Application No. PCT/JP2013/060627, filed on Apr. 8, 2013, which claims the benefit under 35 U.S.C. § 119(a)-(d) of Japanese Application No. 2013-029632, filed on Feb. 19, 2013, the entireties of which are incorporated herein by reference.

BACKGROUND OF THE INVENTION

Field of the Invention

The present invention relates to a method of modifying refractory particles for a casting mold, refractory particles for a casting mold obtained by the method, and a method of producing a casting mold. The present invention relates more particularly to a technique of modifying refractory particles used as a molding sand that constitutes a casting mold used for sand mold casting performed by using metals in a molten state, such as aluminum, an aluminum alloy, cast iron, cast steel, copper and a copper alloy. The technique permits an advantageous improvement of the strength of the casting mold produced by using the refractory particles.

Description of Related Art

As the casting mold used for casting a desired molten metal such as aluminum or an aluminum alloy described above, there has been used a sand mold produced by forming a molding sand composition obtained by kneading a molding sand in the form of refractory particles or aggregate with a binder that bonds the refractory particles together. As one type of the sand mold, an organic self-curing mold which is called a furan mold and produced by using a furan resin as the binder is well known.

As the refractory particles (molding sand) giving the casting mold described above, natural sands such as silica sand, zircon sand, olivine sand and chromite sand are widely used. However, the naturally produced sands have undesirable variation in their quality such as physicochemical properties and an inherent problem of exhaustion due to recent reduction of natural resources. Therefore, the use of artificially produced refractory particles has been proposed, and various kinds of artificial aggregate containing mullite or corundum as a major mineral have been practically used.

For example, JP-B-3(1991)-47943 and JP-B-4(1992)-40095 propose a method of producing a spherical molding sand by preparing a slurry having a chemical composition containing 20-70% by weight of $Al_2O_3$ and 80-30% by weight of $SiO_2$, and spraying the slurry into a hot air by using a spray drier to obtain spherical particles having a diameter of 0.05-2.0 mm, and then sintering the obtained particles within a rotary kiln. JP-A-2003-251434 discloses a method of producing a molding sand in the form of spherical particles mainly composed of a synthetic mullite and having a chemical composition containing 40-90% by weight of alumina and 60-10% by weight of silica, by blowing an air on a raw material composition melted at a temperature of 1600-2200° C. Further, JP-A-2004-202577 discloses a technique of producing, by a flame fusion method, a spherical molding sand which is mainly composed of $Al_2O_3$ and $SiO_2$ contained at a weight ratio $Al_2O_3/SiO_2$ of 1-15, and which has an average particle diameter of 0.05-1.5 mm and a sphericity of not less than 0.95.

In the case where the artificial aggregate in the form of the artificially produced refractory particles is used to produce the casting mold by using an organic binder, a larger amount of the organic binder is required than in the case where the naturally produced silica sand or the like is used. Therefore, where substantially the same amount of the organic binder is used in production of the casting mold, the use of the artificial aggregate gives rise to an inherent problem of a lower degree of the strength of the casting mold. In this respect, it is noted that the amount of the binder is adequately determined depending on an application of the casting mold. A larger amount of the binder generally results in a higher degree of the strength of the casting mold, so that the casting mold having a desired structure can be obtained by using a larger amount of the binder. However, an excessively large amount of the binder is not desirable since it leads to undesirable increases of a cost and a risk of a gas defect which may be caused in practical use of the casting mold. On the other hand, an excessively small amount of the binder leads to an insufficient degree of the strength of the casting mold, resulting in failure to obtain the casting mold having the desired structure. Under the above-described circumstances, JP-A-2003-251434 and JP-A-2004-202577 described above and JP-A-2011-25310 disclose that the required amount of the binder can be reduced by producing the artificial aggregate at a higher temperature, to densify the particles of the aggregate and to reduce an apparent porosity of the particles.

However, there is a limitation in the reduction of the required amount of the binder achieved by the above-described conventional means for densifying the particles. Therefore, it is desired to establish a novel technique of modifying the artificial aggregate, which technique permits an improvement of the strength of the casting mold without an increase of the required amount of the binder, to further reduce the required amount of the binder.

SUMMARY OF THE INVENTION

The present invention was made in view of the background art described above. Therefore, it is an object of the present invention to provide a method of modifying the refractory particles used to produce the casting mold by using the furan resin as the binder, which method permits an effective improvement of the strength of the casting mold to advantageously reduce the required amount of the binder. Another object of the invention is to provide the refractory particles for the casting mold, which are modified by the above-described method, and a further object of the invention is to provide a method of producing the casting mold having excellent properties, by using such refractory particles.

The inventors of the present invention made intensive studies to achieve the above-described objects, and found that where an artificial aggregate having an apparent porosity of not more than 5% is used as the refractory particles to produce the casting mold by using the furan resin as the binder, the strength of the furan mold (casting mold) produced by using the artificial aggregate can be effectively increased, and the required amount of the binder can be reduced, by subjecting the artificial aggregate to a specific heat treatment in an atmosphere (including a reducing atmosphere) having a predetermined low degree of oxygen concentration.

The present invention was completed based on the above-described finding, and a first aspect of the present invention provides a method of modifying refractory particles used to produce a casting mold by using a furan resin as a binder, so as to improve a strength of the casting mold, characterized in that an artificial aggregate which is artificially produced and which has an apparent porosity of not more than 5% is used as the refractory particles and the artificial aggregate is subjected to a heat treatment at a temperature of 400-1500° C. for not shorter than one hour in a heating atmosphere having an oxygen concentration of not higher than 15%.

According to a preferable form of the method of modifying the refractory particles for the casting mold according to the present invention, the artificial aggregate consists of mullite particles, mullite-corundum particles or corundum particles.

According to another preferable form of the present invention, the heat treatment is performed within a rotary kiln. According to a further preferable form of the present invention, the heating atmosphere is a reducing atmosphere.

In the present invention, the artificial aggregate is advantageously a molten sand or a sintered sand.

The present invention also provides refractory particles obtained by the above-described method, and a casting mold obtained by using the refractory particles.

Another aspect of the present invention provides a method of producing a casting mold comprising the steps of: (a) providing refractory particles modified by the above-described method; (b) kneading the modified refractory particles with a furan resin used as a binder, and a curing agent, thereby obtaining a self-curing molding sand composition; and (c) forming the thus obtained self-curing molding sand composition into the casting mold.

By the method of modifying the refractory particles for the casting mold according to the present invention, surfaces of the refractory particles can be effectively modified so as to have high degrees of affinity with respect to the furan resin and the curing agent. Therefore, a sufficiently high degree of the strength of the casting mold can be achieved by using a small amount of the binder (furan resin).

The casting mold formed by using the thus modified refractory particles exhibits the sufficiently high degree of strength by the use of a required minimum amount of the binder, so that the cost of the binder can be advantageously reduced. Further, an amount of a gas generated by decomposition of the binder during casting can be advantageously reduced, whereby the risk of the gas defect can be effectively reduced.

DETAILED DESCRIPTION OF THE INVENTION

A modification method according to the present invention is applied to refractory particles in the form of an artificially produced aggregate (particles). The modification method according to the present invention may be applied to any known artificial aggregate as long as the aggregate has a highly dense structure with an apparent porosity of not more than 5%. Specific examples of the artificial aggregate include: a sintered sand granulated by using a spray drier and then fired within a rotary kiln; a sintered sand granulated by a rolling granulation process and then fired within the rotary kiln; a molten sand produced by melting a raw material composition at a high temperature and spraying the molten material composition by using an air; and a molten sand obtained by a flame fusion method. Also, it is possible to use sintered mullite, electromolten mullite, sintered alumina and electromolten alumina, which are subjected to a pulverizing treatment. Among the above-described artificial aggregates, the molten sands and the sintered sands are suitably used in the present invention, and the artificial aggregate in the form of spherical particles is more preferably used. In this respect, it is noted that more specific methods of producing the artificial aggregate are described in the above-identified patent documents, and the artificial aggregates disclosed in those patent documents may be used in the present invention without any modification.

The artificial aggregate used in the present invention preferably consists of mullite particles, mullite-corundum particles or corundum particles. Accordingly, the artificial aggregate is required to contain at least $Al_2O_3$ in an amount that permits generation of a crystalline structure of mullite. A chemical composition giving such a crystalline structure generally contains $Al_2O_3$ in an amount of not less than 60% by weight, and preferably not less than 68% by weight, with the balance mainly composed of $SiO_2$. Where $Al_2O_3$ is contained in an amount exceeding 77% by weight, a crystalline structure of corundum is generated, and where $Al_2O_3$ is contained in an amount of not less than 90% by weight, the crystalline structure of corundum becomes dominant. In this respect, it is noted that the term "mullite-corundum particles" means the particles in which the crystalline structures of mullite and corundum coexist or are dispersed.

In order to effectively achieve an effect of modification according to the present invention, the artificial aggregate is required to have the highly dense structure with the apparent porosity of not more than 5%. Where the apparent porosity exceeds 5%, a strength of a casting mold cannot be sufficiently increased even where the artificial aggregate is subjected to a modification treatment according to the present invention, so that it is difficult to advantageously reduce a required amount of the binder. In order to obtain the artificial aggregate having the apparent porosity described above, the artificial aggregate is produced at a high temperature exceeding 1500° C. so as to densify the artificial aggregate, whereby the required amount of the binder can be reduced. The required amount of the binder can be further reduced by practicing the modification method according to the present invention with respect to the artificial aggregate having the apparent porosity described above. In this respect, it is noted that in the present invention, the apparent porosity of the artificial aggregate is determined according to a measuring method specified in JIS-R-2205.

The artificial aggregate used in the present invention has a particle diameter similar to that of the conventional molding sand. An average particle diameter of the artificial aggregate is generally within a range between about 0.01 mm and about 2.00 mm, and preferably between about 0.05 mm and about 1.00 mm. Where the particle diameter is smaller than 0.01 mm, the artificial aggregate is difficult to handle, and there arises a risk of insufficient degassing during a casting operation, for example. On the other hand, a particle diameter larger than 2.00 mm gives rise to a problem of an increase of a surface roughness of a cast product, for example. Therefore, the artificial aggregate is produced so as to have a diameter within the range between about 0.01 mm and about 2.00 mm, or the artificial aggregate having the desired particle diameter is obtained by performing a sieving or other operation after its production, as necessary.

The modification method according to the present invention is practiced by subjecting the above-described artificial aggregate to a heat treatment performed at a temperature of 400-1500° C. for not shorter than one hour in a heating atmosphere having an oxygen concentration of not higher than 15%, whereby surface properties of the artificial aggregate are effectively modified.

It has not been clear as to the reason why the artificial aggregate is modified by such a heat treatment so as to permit an improvement of the strength of the casting mold produced by using the furan resin as the binder. However, it is supposed that the heat treatment causes changes in the surface properties of the artificial aggregate, as described below.

Namely, in production of the artificial aggregate having the apparent porosity of not more than 5%, a high energy is required to obtain the highly dense structure of the artificial aggregate. In the case where the artificial aggregate is produced by subjecting particles granulated by using the spray drier to a firing operation within the rotary kiln, for example, the particles are fired at a high temperature of 1500-1850° C. During the firing operation performed at the high temperature described above, the structure of the artificial aggregate is densified while a certain amount of a liquid phase is generated so as to intervene in the structure. Once the artificial aggregate is cooled to the room temperature, the liquid phase generated at the high temperature exists as an amorphous phase in the artificial aggregate. The amorphous phase is energetically unstable and has low degrees of affinity with the furan resin and a curing catalyst, so that it is supposed that the existence of the amorphous phase makes it difficult to achieve a high degree of the strength of the casting mold. On the other hand, where the artificial aggregate consists of the molten sand obtained by melting a raw material composition at a high temperature and spraying the molten material composition by using an air, the molten sand is produced at a high temperature of 1600-2200° C. Further, where the artificial aggregate consists of the molten sand obtained by the flame fusion method, the molten sand is produced at a high temperature of about 2000° C. Accordingly, the amorphous phase also exists on surfaces of these molten sands, and it is supposed that the existence of the amorphous phase results in deterioration of affinity of the molten sands with respect to the furan resin and the curing catalyst.

However, in the present invention, the heat treatment is performed at a temperature lower than the temperatures (firing temperature and melting temperature) at which the above-described artificial aggregates are produced. Further, the heat treatment is performed in the atmosphere having the low degree of oxygen concentration. It is supposed that owing to the specific heat treatment according to the present invention, the amorphous phase existing on surfaces of the artificial aggregate is advantageously stabilized, to effectively improve the surface properties of the artificial aggregate, whereby the affinity of the artificial aggregate with respect to the furan resin and a curing agent can be advantageously improved, so that a sufficiently high degree of the strength of the casting mold can be advantageously achieved by using a small amount of the binder (furan resin). In view of the modification mechanism described above, the artificial aggregate subjected to the modification method according to the present invention preferably consists of a new or fresh sand as produced (a sand which has never been used to form the casting mold), rather than a recovered sand or a reclaimed sand.

The temperature at which the heat treatment according to the present invention is performed is adequately selected within the range of 400-1500° C., depending on the material of the artificial aggregate. Where the heat treatment is performed at a temperature lower than 400° C., an effect of the heat treatment cannot be sufficiently exhibited. On the other hand, where the heat treatment is performed at a temperature higher than 1500° C., it is difficult to sufficiently achieve the effect of modification by the heat treatment. The heat treatment is preferably performed at a temperature within a range of 600-1400° C., and more preferably within a range of 800-1200° C. Further, in order to sufficiently achieve the effect of modification of the artificial aggregate by the heat treatment, it is necessary to perform the heat treatment for not shorter than one hour. A period of performing the heat treatment is adequately selected depending on the heating temperature, so as not to be shorter than one hour. The heat treatment is generally performed for a period not longer than about 10 hours, since the effect of modification is saturated when 10 hours have passed after initiation of the heat treatment. The heat treatment is advantageously performed for a period of about 1.5-8 hours, and preferably about 2-5 hours.

The heating atmosphere in which the heat treatment according to the present invention is performed is preferably generated by combusting a liquid fuel or a gaseous fuel with a burner. The heating atmosphere having the low degree of oxygen concentration is advantageously a high-temperature combustion gas generated by using the burner. Namely, propane, which is a general gaseous fuel, is combusted through a chemical reaction represented by a chemical formula: $C_3H_8+5O_2\rightarrow 3CO_2+4H_2O$, in which $O_2$ is generally supplied from oxygen in the air. Accordingly, by causing this combustion reaction within a heating device used to perform the heat treatment on the artificial aggregate, the oxygen concentration within the heating device can be effectively reduced to zero. It is preferable that the heating atmosphere in which the heat treatment according to the present invention is performed has a low degree of oxygen concentration of not higher than 15%, preferably not higher than 10%, more preferably not higher than 5%, and particularly preferably not higher than 3%. Further, the heat treatment is advantageously performed in a reducing atmosphere. In this respect, it is noted that the oxygen concentration in the atmosphere within the heating device can be easily detected by measuring an exhaust gas from the heating device by using an oxygen analyzer.

Although any one of various known heat treatments may be adequately performed on the artificial aggregate according to the invention, it is particularly recommended to employ the heat treatment performed within the rotary kiln. In the heat treatment using the rotary kiln, the artificial aggregate is rolled and moved within the rotated rotary kiln, in the atmosphere of the high-temperature combustion gas generated with the burner, whereby the desired heat treatment can be uniformly performed on the entirety of the artificial aggregate. The period of performing this heat treatment is generally set as a period from a moment of introducing the artificial aggregate into the rotary kiln to a moment of taking the artificial aggregate out of the rotary kiln.

The artificial aggregate subjected to the above-described heat treatment and having the improved surface properties can further effectively improve the strength of the casting mold produced by using the furan resin as the binder, whereby the required amount of the binder (furan resin) can be advantageously reduced while a sufficiently high degree of the strength of the casting mold is secured.

The intended casting mold, namely, an organic self-curing mold can be produced by any one of various known methods using the artificial aggregate modified by the heat treatment according to the present invention, as the refractory particles (molding sand), and the furan resin (binder). The furan resin used as the binder is obtained by a polycondensation reaction using furfuryl alcohol as a major component. For example, the furan resin is obtained by the polycondensation reaction among furfuryl alcohol, urea and an aldehyde (such as formaldehyde, glyoxal and furfural). Any one of various kinds of furan resins commercially available for production of the casting mold may be adequately selected and used in the present invention. The furan resin is generally used in an amount of about 0.5-3 parts by weight per 100 parts by weight of the modified artificial aggregate (refractory particles), and kneaded with the artificial aggregate.

A known curing agent for curing the furan resin is further kneaded with and contained in a self-curing molding sand composition obtained by kneading the artificial aggregate (refractory particles) with the furan resin as described above. Examples of the curing agent include known phosphoric-acid-type compounds and sulfonic-acid-type compounds. Examples of the phosphoric-acid-type compounds include: phosphoric acid; condensed phosphoric acid; phosphate esters such as methylphosphonate and ethylphosphonate; and phosphates such as potassium phosphate and potassium hydrogenphosphate. Examples of the sulfonic-acid-type compounds include: aliphatic sulfonic acids such as methanesulfonic acid and ethanesulfonic acid; aromatic sulfonic acids such as benzenesulfonic acid, toluenesulfonic acid, xylenesulfonic acid and phenolsulfonic acid; and inorganic acids such as sulfuric acid. The curing agent is generally used in an amount of about 10-70 parts by weight, and preferably about 20-60 parts by weight, per 100 parts by weight of the furan resin.

Other additives may be further kneaded with and contained in the self-curing molding sand composition, as necessary. Examples of the additives include: known curing accelerators including phenol derivatives such as resorcinol and phloroglucinol and furan derivatives such as 2,5-bishydroxymethylfuran and 2-hydroxymethyl-5-methoxymethylfuran; and various known silane coupling agents such as γ-(2-amino)aminopropylmethyldimethoxysilane, γ-aminopropyltrimethoxysilane, γ-aminopropyltriethoxysilane and γ-glycidoxypropyltrimethoxysilane. These additives may be used in conventional amounts.

The intended casting mold can be formed of the self-curing molding sand composition obtained by kneading the artificial aggregate (refractory particles), the furan resin, the curing agent and the other additives used as necessary, by a conventional forming method. The thus obtained casting mold is a self-curing mold which cures at the room temperature without heating and exhibits a sufficiently high degree of the strength.

In production of the casting mold by using the artificial aggregate (refractory particles) modified according to the present invention, as the molding sand, the modified artificial aggregate may be used alone. Alternatively, the silica sand or other conventional molding sand, the recovered sand, the reclaimed sand or the artificial aggregate which has not been modified may be used together with the modified artificial aggregate, in an amount that does not impede characteristics of the present invention. The amount that does not impede the characteristics of the present invention is not more than about 50% by weight, and preferably not more than 30% by weight. Further, the artificial aggregate modified according to the present invention may be used as a spot sand to constitute a part of the casting mold, or used only as a core sand.

EXAMPLES

To clarify the present invention more specifically, some examples according to the invention will be described together with comparative examples, but it goes without saying that the present invention is not limited to the details of the illustrated examples. It is to be understood that the present invention may be embodied with various other changes, modifications and improvements, which are not illustrated herein and which may occur to those skilled in the art, without departing from the spirit and scope of the invention.

Example 1

Initially, a sintered spherical sand granulated by using a spray drier and then fired within a rotary kiln was provided as an artificial aggregate. The sintered sand had a chemical composition containing 60.5% by weight of $Al_2O_3$ and 35.5% by weight of $SiO_2$, and an average particle diameter of about 0.2 mm. An apparent porosity of the sintered sand measured according to the measuring method specified in WS-R-2205 was 3.5%.

Then, the artificial aggregate was introduced into a rotary kiln, and heat treatments were performed on the artificial aggregate for two hours at respective different temperatures shown in Table 1 given below, while the artificial aggregate was rolled and moved within the rotary kiln. An atmosphere within the rotary kiln was controlled so as to be a heating atmosphere having an oxygen concentration of about 3%, by using a combustion gas generated with a burner.

A predetermined curing agent was added to each of the thus obtained various kinds of sintered spherical sands subjected to the respective heat treatments described above, and the curing agent and the sintered spherical sand were mixed (kneaded) together for 30 seconds, by using a mixer. Then, a predetermined furan resin was added to the mixture, and the mixture was further mixed for 30 seconds, whereby various kinds of self-curing molding sand compositions (kneaded mass) were obtained. In this respect, it is noted that "EF5301" available from Kao-Quaker Company, Limited, JAPAN was used as the furan resin, and "C-17" available from Kao-Quaker Company, Limited was used as the curing agent. The furan resin was used in an amount of 1.5 parts by weight per 100 parts by weight of the sintered spherical sand (i.e. the furan resin was used at a percentage of 1.5%). The curing agent was used in an amount of 50 parts by weight per 100 parts by weight of the furan resin.

Wooden frames having a diameter of 50 mm and a height of 50 mm were filled with the thus obtained various kinds of molding sand compositions, whereby casting mold samples were formed. The samples were held within a constant temperature and humidity bath under the conditions of: a temperature of 30° C. and a humidity of 80%, such that a curing reaction proceeds within the bath. After predetermined periods shown in Table 1 had passed, a compressive strength of each sample (the strength of the casting mold) was measured according to the test procedure: HM-1 "Compressive Strength Test Procedure" of JACT (Japanese Association of Casting Technology). Results of the measurement are shown in Table 1.

TABLE 1

| Sample | Temperature (° C.) of Heat Treatment | Amount (%) of Furan Resin | Compressive Strength (kg/cm$^2$) | | |
|---|---|---|---|---|---|
| | | | after 1 hour | after 3 hours | after 24 hours |
| B1 | unheated | 1.5 | 10.7 | 18.7 | 25.7 |
| B2 | 200 | 1.5 | 8.0 | 19.2 | 26.0 |
| A1 | 400 | 1.5 | 15.1 | 22.3 | 35.5 |
| A2 | 800 | 1.5 | 20.2 | 29.5 | 37.6 |
| A3 | 1400 | 1.5 | 22.0 | 30.1 | 42.5 |
| B3 | 1600 | 1.5 | 11.3 | 19.8 | 29.5 |

As is apparent from the results shown in Table 1, in the samples A1 to A3 obtained by using the sintered spherical sands subjected to the heat treatments at the temperatures within the range according to the present invention, the compressive strength is considerably improved as compared with that of the sample B1 obtained by using the sintered spherical sand which was not subjected to the heat treatment. Further, it is recognized that in the samples B2 and B3 obtained by using the sintered spherical sands subjected to the heat treatments at the temperatures outside the range of the present invention, the compressive strength is not sufficiently improved.

Example 2

The sintered spherical sand provided in the Example 1 was subjected to heat treatments performed at a temperature of 1000° C. for two hours in atmospheres having respective different oxygen concentrations shown in Table 2 given below, by using the rotary kiln as in the Example 1. In this respect, it is noted that a reducing atmosphere was generated by subjecting the sintered sand to the heat treatment together with a carbon powder, and used as the heating atmosphere having an oxygen concentration of 0%.

Casting mold samples were produced by using the thus obtained various kinds of sintered sands subjected to the respective heat treatments, as in the Example 1. The compressive strength of each sample was measured after predetermined periods had passed. Results of the measurement are shown in Table 2.

TABLE 2

| Sample | Oxygen Concentration (%) in Atmosphere for Heat Treatment | Amount (%) of Furan Resin | Compressive Strength (kg/cm$^2$) | | |
|---|---|---|---|---|---|
| | | | after 1 hour | after 3 hours | after 24 hours |
| B4 | 20 | 1.5 | 13.5 | 20.2 | 29.5 |
| A4 | 8 | 1.5 | 20.0 | 28.5 | 38.5 |
| A5 | 3 | 1.5 | 25.0 | 30.3 | 40.2 |
| A6 | 0 | 1.5 | 30.1 | 38.0 | 51.2 |

As is apparent from the results shown in Table 2, in the samples A4 to A6 obtained by using the sintered spherical sands subjected to the heat treatments in the atmospheres having the oxygen concentrations within the range according to the present invention, the compressive strength is considerably improved as compared with that of the sample B4 obtained by performing the heat treatment in the atmosphere having the oxygen concentration equal to that in the air. It is recognized that a particularly significant improvement of the compressive strength is achieved in the sample A6 obtained by performing the heat treatment using the reducing atmosphere generated by subjecting the sintered sand to the heat treatment together with the carbon powder.

Example 3

A molten sand obtained by spraying a molten material composition by using an air, and two kinds of sintered sands X and Y obtained by the rolling granulation process were provided as artificial aggregates. The molten sand had: a chemical composition containing 73.0% by weight of $Al_2O_3$, 19.7% by weight of $SiO_2$, 1.8% by weight of $Fe_2O_3$, and 2.9% by weight of $TiO_2$; an apparent porosity of 3.9%; and an average particle diameter of about 0.3 mm. The sintered sand X obtained by the rolling granulation process had: a chemical composition containing 75.0% by weight of $Al_2O_3$, 11.0% by weight of $SiO_2$, 9.0% by weight of $Fe_2O_3$, and 3.0% by weight of $TiO_2$; an apparent porosity of 1.4%; and an average particle diameter of about 0.3 mm. The sintered sand Y obtained by the rolling granulation process had a chemical composition containing 99.5% by weight of $Al_2O_3$, an apparent porosity of 3.8% and an average particle diameter of about 0.3 mm.

As shown in Table 3 given below, casting mold samples were produced by using the thus provided three kinds of artificial aggregates which were not subjected to a heat treatment and the three kinds of artificial aggregates which were subjected to heat treatments at predetermined temperatures within the rotary kiln as in the Example 1. After the curing reaction had proceeded for predetermined periods, the compressive strength of each sample was measured as in the Example 1. Results of the measurement are shown in Table 3.

TABLE 3

| Sample | Artificial Aggregate | Temperature (° C.) of Heat Treatment | Amount (%) of Furan Resin | Compressive Strength (kg/cm$^2$) | | |
|---|---|---|---|---|---|---|
| | | | | after 1 hour | after 3 hours | after 24 hours |
| B5 | Molten | unheated | 1.3 | 7.7 | 15.8 | 26.2 |
| A7 | Sand | 1000 | 1.3 | 22.0 | 39.2 | 59.6 |
| B6 | Sintered | unheated | 1.3 | uncured | uncured | uncured |
| A8 | Sand X | 1200 | 1.3 | 16.1 | 31.7 | 46.2 |
| B7 | Sintered | unheated | 1.0 | 10.0 | 12.3 | 19.3 |
| A9 | Sand Y | 1400 | 1.0 | 23.2 | 33.9 | 43.9 |

As is apparent from the results shown in Table 3, it is recognized that also in the case where the molten sand and the sintered sands X and Y obtained by the rolling granulation process were used as the artificial aggregates, high degrees of the compressive strength can be achieved by subjecting the artificial aggregates to the predetermined heat treatments. Further, it was confirmed that the heat treatments did not change the chemical compositions and the apparent porosities of the respective sands.

Example 4

The sintered spherical sand was subjected to a heat treatment using the rotary kiln as in the Example 1, except that the heat treatment was performed at a temperature of 1000° C. in an atmosphere having an oxygen concentration of 3%. Casting mold samples were produced as in the Example 1, by using respective different amounts (%) of the furan resin with respect to the amount of the sintered spherical sand, as shown in Table 4 given below. After the curing reaction had proceeded for predetermined periods, the compressive strength of each sample was measured as in the Example 1. Results of the measurement are shown in Table 4.

TABLE 4

| Sample | Temperature (° C.) of Heat Treatment | Amount (%) of Furan Resin | Compressive Strength (kg/cm²) | | |
|---|---|---|---|---|---|
| | | | after 1 hour | after 3 hours | after 24 hours |
| B8 | unheated | 1.5 | 10.7 | 18.7 | 25.7 |
| A10 | 1000 | 1.0 | 15.3 | 21.6 | 25.9 |
| A11 | | 1.3 | 17.1 | 26.5 | 33.4 |
| A12 | | 1.5 | 21.0 | 32.3 | 41.8 |

As is apparent from the results shown in Table 4, it is recognized that in the sample A10 which was obtained by using the sintered sand subjected to the predetermined heat treatment and which has the compressive strength substantially equal to that of the sample B8 obtained by using the sintered sand which was not subjected to the heat treatment, the furan resin was used in an amount of 1.0% by weight, which is two-thirds of the amount of the furan resin used in the sample B8. In other words, it is recognized that by performing the heat treatment according to the present invention, a sufficiently high degree of the strength of the casting mold can be achieved by using a reduced amount of the binder.

Example 5

Various kinds of sintered spherical sands (artificial aggregates) having respective different apparent porosities shown in Table 5 given below were subjected to a heat treatment using the rotary kiln as in the Example 1, except that the heat treatment was performed at a temperature of 1000° C. By using the thus obtained various kinds of sintered sands subjected to the heat treatment, casting mold samples were produced as in the Example 1. The compressive strength of each sample was measured after predetermined periods. Results of the measurement are shown in Table 5.

TABLE 5

| Sample | Apparent Porosity (%) of Artificial Aggregate | Temperature (° C.) of Heat Treatment | Compressive Strength (kg/cm²) | | |
|---|---|---|---|---|---|
| | | | after 1 hour | after 3 hours | after 24 hours |
| B11 | 10 | unheated | 5.3 | 10.2 | 15.1 |
| B12 | 10 | 1000 | 5.5 | 11.3 | 15.6 |
| B13 | 7 | unheated | 7.2 | 15.6 | 20.8 |
| B14 | 7 | 1000 | 8.1 | 18.2 | 24.3 |
| B15 | 4 | unheated | 10.5 | 20.6 | 25.3 |
| A15 | 4 | 1000 | 20.8 | 35.1 | 42.6 |
| B16 | 2 | unheated | 11.8 | 21.5 | 26.3 |
| A16 | 2 | 1000 | 20.2 | 36.8 | 43.4 |

As is apparent from the results shown in Table 5, it is recognized that in the samples B11 to B14 obtained by using the artificial aggregates in the form of the sintered sands having the apparent porosities higher than 5%, it is difficult to achieve a sufficient improvement of the compressive strength, even where the sintered sands were subjected to the heat treatment at 1000° C., as well as in the case where the sintered sands were not subjected to the heat treatment, presumably because larger amounts of the furan resin and the curing agent were absorbed in pores of those sintered sands, whereby the furan resin did not sufficiently function as the binder. On the other hand, it is recognized that in the samples A15 and A16 obtained by using the sintered sands having the apparent porosities not higher than 5% according to the present invention, the compressive strength is considerably improved owing to the heat treatment.

Example 6

The artificial aggregate in the form of the sintered spherical sand was subjected to a heat treatment within the rotary kiln as in the Example 1, except that the heat treatment was performed at a temperature of 1000° C. Casting mold samples were produced as in the Example 1, by using the thus obtained sintered sand subjected to the heat treatment and respective different kinds of commercially available furan resins as the binder. In this respect, it is noted that "EF5301" available from Kao-Quaker Company, Limited was used as one of the furan resins, and "TK-3" available from Kao-Quaker Company, Limited was used as the curing agent. Further, "X-furan K-55W2" available from KOBE RIKAGAKU KOGYO CO., LTD., JAPAN was used as the other furan resin, and "150C" available from KOBE RIKAGAKU KOGYO CO., LTD. was used as the curing agent. The furan resins were used in an amount of 1.5%, and the curing agents were used in an amount of 50 parts by weight per 100 parts by weight of the respective furan resins. The casing mold samples were cured in the constant temperature and humidity bath under the conditions of: a temperature of 25° C. and a humidity of 55% RH. After the casting mold samples were held within the constant temperature and humidity bath for predetermined periods, the compressive strength of each sample was measured as in the Example 1. Results of the measurement are shown in Table 6 given below.

TABLE 6

| Sample | Manufacturer of Furan Resin | Temperature (° C.) of Heat Treatment | Compressive Strength (kg/cm²) | | |
|---|---|---|---|---|---|
| | | | after 1 hour | after 3 hours | after 24 hours |
| B17 | Kao-Quaker Company, Limited | unheated | 19.0 | 24.3 | 29.7 |
| A17 | | 1000 | 35.1 | 38.4 | 44.4 |
| B18 | KOBE RIKAGAKU KOGYO CO., LTD. | unheated | 14.8 | 26.8 | 29.5 |
| A18 | | 1000 | 22.2 | 36.4 | 47.8 |

As is apparent from the results shown in Table 6, even where the casting molds were cured in the constant temperature and humidity bath having the temperature and humidity which are different from those employed in the other Examples, the compressive strengths of the casting molds are considerably improved where the casting molds were produced by using the sintered sands subjected to the predetermined heat treatment. Further, it is recognized that the effect of improvement of the compressive strength according to the present invention can be achieved even where the commercially available furan resins different from those used in the other Examples were used.

Example 7

The sintered spherical sand was subjected to heat treatments within the rotary kiln as in the Example 1, except that the heat treatments were performed at a temperature of 1000° C. for respective different periods shown in Table 7 given below. By using the thus obtained various kinds of sintered sands subjected to the respective heat treatments, casting mold samples were produced using the furan resin as the binder, as in the Example 1. The casting mold samples were cured in the constant temperature and humidity bath as in the Example 1. After the casting mold samples had been cured for predetermined periods, the compressive strength of each sample was measured. Results of the measurement are shown in Table 7.

TABLE 7

| Sample | Period (hour) of Heat Treatment | Amount (%) of Furan Resin | Compressive Strength (kg/cm$^2$) | | |
| --- | --- | --- | --- | --- | --- |
| | | | after 1 hour | after 3 hours | after 24 hours |
| B19 | 0.5 | 1.5 | 13.2 | 19.3 | 29.1 |
| A19 | 1 | 1.5 | 20.8 | 28.3 | 38.3 |
| A20 | 5 | 1.5 | 30.3 | 38.8 | 49.2 |
| A21 | 10 | 1.5 | 30.8 | 38.9 | 49.5 |

As is apparent from the results shown in Table 7, it is recognized that a more significant effect of improvement of the compressive strength can be achieved by subjecting the artificial aggregate in the form of the sintered sand to the heat treatments for a longer period of time, but the effect of the improvement of the compressive strength is saturated where the heat treatment is performed for 10 hours.

Comparative Example (1) The sintered spherical sand was subjected to the heat treatment at a temperature of 1000° C. as in the Example 4, and kneaded with an alkali phenol resin ("PHENIX-675MHL" available from KOBE RIKAGAKU KOGYO CO., LTD.) used in an amount of 1.5 parts by weight per 100 parts by weight of the sintered spherical sand. The thus obtained mixture was further kneaded with a curing agent ("C-10" available from KOBE RIKAGAKU KOGYO CO., LTD.) used in an amount of 25 parts by weight per 100 parts by weight of the alkali phenol resin, and a casting mold sample: B21 was produced as in the Example 4. The casting mold sample: B21 was held in an atmosphere having a temperature of 25° C. and a humidity of 55%, such that the curing reaction proceeds. The compressive strength of the casting mold sample: B21 was measured after predetermined periods had passed. Results of the measurement are shown in Table 8 given below, in comparison with results of measurement of the compressive strength of a casting mold sample: B20 obtained by using the above-described sintered spherical sand which was not subjected to the heat treatment.

(2) A resin coated sand (RCS) was produced by using the sintered spherical sand subjected to the heat treatment as described above. A test piece (sample) was formed of the RCS and measured of its flexural strength. The RCS was produced by heating the sintered spherical sand to 130° C., kneading the sintered spherical sand with a phenolic resin ("SP6905U" available from ASAHI ORGANIC CHEMICALS INDUSTRY CO., LTD., JAPAN) used as the binder in an amount of 1.4 parts by weight per 100 parts by weight of the sintered spherical sand, and kneading the thus obtained mixture with calcium stearate used in an amount of 0.1% by weight with respect to the amount of the sintered spherical sand. The thus obtained RCS was heated to 250° C. by using a device for forming the test piece for a flexural test, whereby a test piece: B23 having dimensions of 10 mm×10 mm×60 mm was formed. The flexural strength of the test piece: B23 was measured by a three-point bending test. A result of the measurement is shown in Table 9 given below, in comparison with a result of measurement of the flexural strength of a test piece: B22 obtained by using the above-described sintered spherical sand which was not subjected to the heat treatment.

TABLE 8

| Sample | Temperature (° C.) of Heat Treatment | Compressive Strength (kg/cm$^2$) | | |
| --- | --- | --- | --- | --- |
| | | after 1 hour | after 3 hours | after 24 hours |
| B20 | unheated | 7.4 | 11.2 | 19.4 |
| B21 | 1000 | 7.8 | 11.8 | 19.4 |

TABLE 9

| Sample | Temperature (° C.) of Heat Treatment | Flexural Strength (kg/cm$^2$) |
| --- | --- | --- |
| B22 | unheated | 52.1 |
| B23 | 1000 | 56.4 |

As is apparent from the results shown in Tables 8 and 9, the effect of the heat treatment performed on the artificial aggregate in the form of the sintered sand was not achieved in terms of the compressive strength of the casting mold in the case where the alkali phenol resin was used as the binder, and in terms of the flexural strength of the casting mold in the case where the resin coated sand (RCS) was produced by using the sintered sand and the phenolic resin used as the binder. In view of these results, it can be said that the excellent effects of the heat treatment performed on the artificial aggregate (sintered sand) can be exhibited in the case where the furan resin is used as the binder.

The invention claimed is:

1. A method of modifying refractory particles for forming a casting mold using a furan resin as a binder, whereby a strength of the casting mold is improved, the method comprising the steps of:
   providing new refractory particles comprising an artificial aggregate which is artificially produced and which has an apparent porosity of not more than 5%; and
   subjecting the artificial aggregate to a heat treatment, at a temperature of 400-1500° C. for a heat treatment period of at least 2 hours to 8 hours in a heating atmosphere having an oxygen concentration of not higher than 15%, to provide modified new refractory particles before forming the casting mold from the modified new refractory particles.

2. The method of modifying the refractory particles for the casting mold according to claim 1, wherein the artificial aggregate is selected from the group consisting of mullite particles, mullite-corundum particles and corundum particles.

3. The method of modifying the refractory particles for the casting mold according to claim 2, wherein the artificial aggregate contains not less than 60% by weight of $Al_2O_3$.

4. The method of modifying the refractory particles for the casting mold according to claim 1, wherein the heat treatment is performed within a rotary kiln.

5. The method of modifying the refractory particles for the casting mold according to claim 1, wherein the oxygen concentration in the heating atmosphere is not higher than 10%.

6. The method of modifying the refractory particles for the casting mold according to claim 1, wherein the heating atmosphere is a reducing atmosphere.

7. The method of modifying the refractory particles for the casting mold according to claim 1, wherein the artificial aggregate consists of spherical particles.

8. The method of modifying the refractory particles for the casting mold according to claim 1, wherein the artificial aggregate is a molten sand or a sintered sand.

9. The method of modifying the refractory particles for the casting mold according to claim 1, wherein the artificial aggregate has an average particle diameter of 0.01-2.00 mm.

10. A method of producing a casting mold comprising the steps of:
   providing modified new refractory particles that are modified by the method according to claim 1;
   kneading the modified new refractory particles with a furan resin used as a binder, and a curing agent, thereby obtaining a self-curing molding sand composition; and
   forming the thus obtained self-curing molding sand composition into the casting mold.

11. The method of producing the casting mold according to claim 10, wherein the furan resin is used in an amount of 0.5-3 parts by weight per 100 parts by weight of the modified new refractory particles.

* * * * *